(12) United States Patent
Rapp (10) Patent No.: US 11,581,948 B2
(45) Date of Patent: Feb. 14, 2023

(54) ADAPTIVE CONSTELLATION DIAGRAM REDUCING THE IMPACT OF PHASE DISTORTIONS

(71) Applicant: Xieon Networks S.a.r.l., Senningerberg (LU)

(72) Inventor: Lutz Rapp, Deisenhofen (DE)

(73) Assignee: XIEON NETWORKS S.a.r.l., Luxembourg (LU)

( * ) Notice: Subject to any disclaimer, the term of this patent is extended or adjusted under 35 U.S.C. 154(b) by 687 days.

(21) Appl. No.: 16/074,287

(22) PCT Filed: Feb. 28, 2017

(86) PCT No.: PCT/EP2017/054584
§ 371 (c)(1),
(2) Date: Jul. 31, 2018

(87) PCT Pub. No.: WO2017/153204
PCT Pub. Date: Sep. 14, 2017

(65) Prior Publication Data
US 2021/0194593 A1    Jun. 24, 2021

(30) Foreign Application Priority Data

Mar. 8, 2016 (EP) ..................... 16159139

(51) Int. Cl.
*H04B 10/54* (2013.01)
*H04B 10/548* (2013.01)
(Continued)

(52) U.S. Cl.
CPC ....... *H04B 10/541* (2013.01); *H04B 10/2537* (2013.01); *H04B 10/54* (2013.01);
(Continued)

(58) Field of Classification Search
None
See application file for complete search history.

(56) References Cited

U.S. PATENT DOCUMENTS 5,903,385 A * 5/1999 Sugaya ............. H04B 10/2912
359/341.42
7,197,090 B1 * 3/2007 Berger ................. H04L 25/062
375/287

(Continued)

OTHER PUBLICATIONS

International Search Report and Written Opinion, PCT/EP2017/054584, dated May 10, 2017, 14 pages.
(Continued)

*Primary Examiner* — Li Liu (57) ABSTRACT

Disclosed herein is a method of encoding and/or decoding data for optical data transmission along a transmission link, as well as corresponding transmitters and receivers. The data is encoded based on an adaptive constellation diagram in a 2-D plane, said constellation diagram including a first and a second pair of symbols, wherein the symbols of the first pair of symbols are located at opposite sides of the origin of the 2-D plane at a first distance di from each other, and wherein the symbols of the second pair of symbols are located at opposite sides of the origin of the 2-D plane at a second distance d2 from each other. The method comprises a step of adapting the constellation diagram by varying the ratio of the first and second distances $d_1$, $d_2$ such as to minimize or nearly minimize a bit error rate in the transmitted data.

13 Claims, 10 Drawing Sheets

(51) Int. Cl.
*H04B 10/61* (2013.01)
*H04B 10/2537* (2013.01)

(52) U.S. Cl.
CPC ......... *H04B 10/548* (2013.01); *H04B 10/613* (2013.01); *H04B 10/6165* (2013.01)

(56) References Cited

U.S. PATENT DOCUMENTS

| | | | | | |
|---|---|---|---|---|---|
| 7,352,832 | B1* | 4/2008 | Lewis | ..................... | H04L 25/06 375/345 |
| 7,711,273 | B2* | 5/2010 | Koc | ....................... | H04B 10/65 398/202 |
| 2004/0042802 | A1* | 3/2004 | Ho | ..................... | H04B 10/2543 398/208 |
| 2004/0208585 | A1* | 10/2004 | Ranka | ..................... | H04J 14/02 398/92 |
| 2004/0252999 | A1* | 12/2004 | Onaka | ................. | H01S 3/06758 398/177 |
| 2005/0063711 | A1* | 3/2005 | Rossi | ..................... | H04B 10/40 398/198 |
| 2009/0279891 | A1* | 11/2009 | Yu | ........................... | H04J 14/06 398/65 |
| 2010/0021179 | A1* | 1/2010 | Kikuchi | ............. | H04B 10/6161 398/183 |
| 2010/0150577 | A1* | 6/2010 | Essiambre | ......... | H04B 10/5053 398/188 |
| 2011/0305457 | A1* | 12/2011 | Kikuchi | ............... | H04B 10/541 398/65 |
| 2011/0318014 | A1* | 12/2011 | Von Lerber | .......... | H04B 10/677 398/115 |
| 2013/0089342 | A1* | 4/2013 | Oveis Gharan | .... | H04B 10/6165 398/208 |
| 2013/0108276 | A1* | 5/2013 | Kikuchi | ............... | H04B 10/697 398/158 |
| 2013/0336649 | A1* | 12/2013 | Essiambre | .............. | H04L 27/06 398/27 |
| 2015/0043680 | A1* | 2/2015 | Rodriquez | .......... | H04L 27/2067 375/308 |
| 2015/0288136 | A1* | 10/2015 | Bolshtyansky | .. | H04B 10/25891 398/79 |
| 2016/0204902 | A1* | 7/2016 | Oveis Gharan | ...... | H04B 10/614 398/208 |

OTHER PUBLICATIONS

Leoni, P. et al., "Constellation Expansion for 100G Transmission," IEEE Photonics Technology Letters, vol. 25 (19): 4 pages (2013).

* cited by examiner

ADAPTIVE CONSTELLATION DIAGRAM REDUCING THE IMPACT OF PHASE DISTORTIONS

This application is a 35 U.S.C. 371 national stage filing of International Application No. PCT/EP2017/054584, filed on Feb. 28, 2017, which claims priority to European Patent Application No. 16159139.1, filed on Mar. 8, 2016. The entire contents of these applications are incorporated herein by reference in their entirety.

FIELD OF THE INVENTION

The present invention is in the field of optical data transmission. More particularly, the invention is related to a new method of encoding and/or decoding data for optical data transmission along a transmission link that employs an adaptive constellation diagram, as well as to a transmitter and a receiver employing the same.

BACKGROUND OF THE INVENTION

Distributed Raman amplification is a favorite technology to improve the performance of optical fiber links. Raman amplification is based on the stimulated Raman scattering (SRS) phenomenon, according to which a lower frequency "signal" photon induces the inelastic scattering of a higher-frequency "pump" photon in an optical medium in the nonlinear regime. As a result of this inelastic scattering, another "signal" photon is produced, while the surplus energy is resonantly passed to the vibrational states of the medium. This process hence allows for an all-optical amplification.

Codirectional Raman amplification is an attractive technology to increase the performance of optical fiber links. In codirectional Raman amplification, the signal to be amplified and the pump light propagate in the same direction. The achievable performance improvement originates from a modified power profile in the transmission fiber that allows to achieve higher output powers at the output of the transmission fiber with comparable impact of nonlinear fiber effects. This finally leads to an improved optical signal-to-noise ratio (OSNR). With the trend to advanced modulation formats at higher data rates employing phase-shift keying, this technology is gaining significantly in importance.

In many cases, using this kind of amplification scheme is the only remaining option for upgrading existing unrepeatered submarine links in an attempt to employ transponders with higher data rates. Note that in the past, preferably counterdirectional Raman amplifiers, i.e. Raman amplifiers where the signal to be amplified and the pump light travel in opposite direction, or even remotely optically pumped amplifiers (ROPAs) have been installed in order to enable communication over long distances without intermediate active components requiring electrical power supply. However, with the introduction of advanced modulation formats, the OSNR at the receivers needs to be increased due to the larger electrical bandwidth or decreased Euclidian distance between the symbols, since sophisticated forward error correction (FEC) codes and the benefits of coherent detection can only partly mitigate the requirement for better signal quality.

Higher-order pumping schemes can in principle provide a noticeable improvement of the system performance when using counterdirectional Raman amplification by moving the location where the optical signals experience gain further away from the end of the fiber span and thus deeper into the fiber. When using second or higher order pumping, power provided by a pump signal is transferred via one or more intermediate lightwaves to data signals transmitted by the optical fiber system. Commercial systems are available that employ pumping of second or third order in counterdirectional Raman amplification, but results for schemes making use of as much as sixth order pumping have been discussed in the literature. Unfortunately, however, there is almost no benefit by applying this counterdirectional pumping scheme to already installed links using ROPAs since this would require a relocation of the ROPA cassettes containing an erbium-doped fiber coil which would usually lead to prohibitive costs. A remarkable advantage of codirectional Raman amplification in this regard is its compatibility with all the above mentioned techniques. In other words, codirectional Raman amplification can be retrofitted to already existing links to further improve performance in a cost-effective manner. Furthermore, higher orders of pumping are also applicable to codirectional pumping.

Of course, pumping schemes combining different orders can be realized. As an example, second order pumping is considered in its pure form. The power of intermediate lightwaves whose wavelength separation to the data signals in principle allows a direct power transfer to the data signals is set to a low value so that no significant direct amplification occurs. In contrast, the wavelength of the pump lightwave is chosen such that no direct amplification of the data signals is possible. Thus, noticeable amplification is only achieved by transferring the power of the pump signal to the intermediate lightwaves and later on to the data signals. However, increasing the launch power of at least one intermediate lightwave allows direct amplification at the beginning of the fiber and second order-like amplification deeper in the transmission fiber. Thus, a mixture of first and second order pumping is achieved by simply modifying the launch powers into the transmission fiber. Configurations of mixed order are also referred to as higher order pumping schemes in the following.

Techniques described so far have been used widely in commercial installations. In contrast, remote amplification in an EDF coil supplied with energy from a pump signal travelling in the same direction as the data signal has mainly been used in some laboratory experiments focused on how far high-speed signals can travel. A reason for this is the increased complexity of the design of transmission systems and the reduced efficiency of such ROPAs as compared with their counterdirectionally pumped counterparts. Nevertheless, this amplification configuration is expected to be the key enabler for deploying the upcoming modulation formats (200 Gbit/s, 400 Gbit/s and beyond) in existing unrepeatered links in the future. This technique is also compatible with higher order pumping schemes.

A common feature of codirectional Raman amplification and remote amplification as described in the paragraph above is that at least one pump signal providing energy for amplifying data signals either in the transmission fiber (Raman amplification) or in an EDF coil (ROPA) is propagating together with data signals in the same direction.

Unfortunately, however, the simultaneous propagation of data signals and a pump signal in an optical fiber, for example for codirectional Raman amplification, also gives rise to additional effects deteriorating system performance. In fact, experimental measurements typically reveal a smaller performance improvement as compared with theoretical results considering the modified power profile only. The transfer of relative intensity noise (RIN) from the pump to the signals via stimulated Raman scattering (SRS) has been investigated intensively and detailed mathematical models have been elaborated for first order and second order pumping schemes. These investigations have a strong focus on the frequency characteristics and deal with intensity modulated signals. Even techniques for suppressing this effect have been proposed.

Performance measurements in unrepeatered links revealed that signals using coherent polarization multiplexing quadrature phase-shift keying (CP-QPSK) are more severely affected by higher-order codirectional Raman amplification as compared with intensity modulated signals, whereas there is only a small difference when using first order pumping. These observations hint to additional effects affecting performance. The occurrence of intensity variations induced by cross-phase modulation (XPM) and phase-to-amplitude conversion due to chromatic dispersion has been proven for fibers with high dispersion.

SUMMARY OF THE INVENTION

The problem underlying the invention is to improve the performance of optical data transmission along a transmission link, particularly, but not exclusively in applications using codirectional Raman amplification. In particular, the solution reduces the impact of phase distortions induced during propagation in an optical fiber, e.g. by a pump light co-propagating with the data signals in the same direction.

This problem is solved by a novel method of processing data for optical data transmission along a transmission link as defined in claim 1, as well as by a transmitter according to claim 12 and a system according to claim 14. Preferable and/or other embodiments are defined in the dependent claims.

According to the method of the invention the data is encoded (and also decoded) based on an adaptive constellation diagram in a two dimensional (2-D) plane, said constellation diagram including a first and a second pair of symbols. The symbols of the first pair of symbols are located at opposite sides of an origin of the 2-D plane at a first distance $d_1$ from each other. The symbols of the second pair of symbols are located at opposite sides of the origin of the 2-D plane at a second distance $d_2$ from each other, wherein a line connecting the first pair of symbols and a line connecting the second pair of symbols are perpendicular to each other. Each constellation point of a pair of constellation points will typically have a same distance from the origin of the 2-D plane. The method comprises a step of adapting the constellation diagram by varying the ratio of the first and second distances $d_1$, $d_2$ such as to minimize or nearly minimize a bit error rate in the transmitted data. Varying the ratio may e.g. include approaches such as the setting of the ratio in a feedforward manner, adjusting the ratio by a closed-loop control, and the scanning of the ratio parameter range for an optimum value. As will become more apparent below, this adaption of the constellation diagram is made in view of a relative amount of phase noise encountered upon transmission along said transmission link.

The invention is based, at least in part, on the observation that a major source of the unsatisfactory performance of data transmission when using codirectional Raman amplifiers is due to varying degrees of phase distortions of the transmitted signals. Such phase distortions are for example induced by power fluctuations of the strong pump transferring power to the first seed in higher order Raman pumping. Using the adaption of the constellation diagram by properly varying the ratio of the first and second distances $d_1$, $d_2$, the performance of data transmission can be significantly improved as compared to a conventional coding scheme in which the distances would be equal and stationary, such as QPSK. Herein, an improvement may be manifest in a reduced bit error rate (BER). However, the inventor has recognized that there is not one particular degree of variation of the ratio of the first and second distances $d_1$, $d_2$ that will generally lead to improvement. Instead, for a general improvement, it is important that these variations are adapted to the noise characteristic of each individual transmission link. More particularly, the inventor found that the proper adjustment ratio of the first and second distances $d_1$, $d_2$ will depend on an amount of phase noise encountered upon transmission along said transmission link, in particular on a relative amount of phase noise as compared with additional noise sources, and more specifically on a relative amount of phase noise as compared to additive noise as to be discussed in more detail below. Since this ratio will vary between different links, it is essential that the encoding scheme adapts to these situations.

If the ratio of the first and second distances $d_1$, $d_2$ is adapted to the relative amount of phase noise encountered upon transmission along said transmission link, this will lead to a reliable and reproducible decrease of the BER. In many embodiments of the invention, information representing or related to the relative amount of phase noise is directly used in order to deterministically adjust the ratio of the first and second distances $d_1$, $d_2$, but the invention is not limited to this. For example, the proper ratio of the first and second distances $d_1$, $d_2$ could alternatively also be determined by trial and error while observing the BER and searching for ratios for which the BER becomes minimal, which would be a less efficient but still possible implementation. Accordingly, while the step of adapting the constellation diagram by varying the ratio of the first and second distances $d_1$, $d_2$ such as to minimize or nearly minimize a bit error rate in the transmitted data is carried out "in view of a relative amount of phase noise encountered upon transmission along said transmission link", this shall only imply that it is the different relative amounts of phase noise encountered on different transmission links that necessitates the adaption, but not that the relative amounts of phase noise are explicitly considered in making the adjustment.

It is noted that a constellation diagram with 4 symbols having pairwise different amplitudes has been presented by Paolo Leoni et al. in "Constellation Expansion for 100G Transmission", IEEE Photonics Technology Letters, vol. 25, No. 19, Oct. 1, 2013. The authors call this modulation scheme 2 amplitude-2 phase-shift keying (2A2P). However, as already suggested by the name, the different constellation points are fix, i.e. they are not adapted to the relative level of phase noise and can hence not generally improve the transmission.

The variation of the first and second distances $d_1$, $d_2$ preferably comprises scaling a base distance $d_0$ with corresponding scaling factors $\alpha$ and $\beta$ according to $$d_1 = d_0 \cdot \alpha \text{ and}$$

$$d_2 = d_0 \cdot \beta,$$

wherein $\alpha^2 + \beta^2 = 2$. If $\alpha = \beta = 1$, then the distances $d_1$, $d_2$ are equal to one another, and the two pairs of symbols would be arranged in the same manner as the four symbols of ordinary QPSK. The further condition $\alpha^2 + \beta^2 = 2$ ensures that varying the distances $d_1$ and $d_2$ does not change the time-averaged power of the signal assuming equal probabilities for all symbols. In case the symbols arise with different probabilities, the sum on the right side of the equation may be adapted accordingly.

In a preferred embodiment, the optical data transmission includes providing energy for distributed or remote amplification by means of a pump light propagating in the same direction as the signal, in particular codirectional Raman amplification involving second, third or even higher order pumping. Namely, it is found that in applications using codirectional Raman amplification, in particular with third or higher order pumping, significant and path dependent amounts of phase noise will occur. By using the invention, the particular advantages of codirectional Raman amplification, in particular the compatibility with most existing links, can be exploited while allowing for a significantly improved transmission performance.

In a preferred embodiment, the transmission is subjected to additive noise and phase noise. Herein, additive noise is characterized by random isotropic shifts of constellation points in the 2-D plane, and phase noise is characterized by a random rotation of constellation point locations with respect to the origin of said 2-D plane. Herein, the degree of variation of the ratio of the first and second distances $d_1$, $d_2$ is determined based on information representing or related to the amount of phase noise or the ratio of the amount of phase noise with regard to the amount of additive noise. According to this embodiment, the ratio of the amount of phase noise with regard to the amount of additive noise may hence be explicitly determined or estimated in an approximative way and then used for choosing the ratio of the first and second distances $d_1$, $d_2$. However, instead of making direct reference to the ratio of the amount of phase noise with regard to the amount of additive noise, it is also possible to base the adjustment on other information "related to this ratio", for example on any functional parameter that exhibits a one-to-one relationship with this ratio, rather than on the ratio itself. For example, variations of the angular offsets are indicative of the amount of phase noise.

In a preferred embodiment, the amount of phase noise and/or the amount of additive noise and/or information representing or related to the ratio of the amount of phase noise with regard to the amount of additive noise is estimated based on a statistical analysis of sample points of data signals received at the receiving side of the transmission link. The corresponding information then has to be transmitted back to the transmitting side of the link, such that the encoder on the transmitting side of the link can adjust the constellation diagram accordingly. Whereas the locations of symbols emitted by the transmitter are called "constellation points" in the following, the locations of the detected data samples in the 2-D plane will be referred to as "sample points" in the following.

In an alternative preferred embodiment, however, the amount of phase noise and/or the amount of additive noise and/or information representing or related to the ratio of the amount of phase noise with regard to the amount of additive noise is estimated based on a statistical analysis of sample points of data signals received at the transmitting side of said transmission link via a similar transmission link for reverse data transmission. Almost all network structures for optical communication transmit data in a bidirectional way via parallel fibers. These parallel optical fibers would resemble an example of "similar transmission links", and it is seen that while there will be generally some differences with respect to signal distortions, the phase noise induced by the nonlinear fiber effects will usually be quite similar. Therefore, it is also possible to analyze the received data of the opposite direction and to use the findings to adjust the constellation diagram, which further simplifies the method.

In a preferred embodiment, the aforementioned information "related to" the ratio of the amount of phase noise with regard to the amount of additive noise corresponds to an asymmetry in the statistical distribution of sample points in a direction parallel to a line interconnecting two adjacent non-adjusted symbols in the 2-D plane, i.e. symbols which are not members of the same pair of symbols. The term "non-adjusted symbols" herein refers to symbol locations prior to the adjustment, i. e. in case of $d_1=d_2=d_0$. For example, assuming that the location of the symbols prior to the adjustment is at positions (1, i), (−1, i), (1, −i) and (−1, −i) in the complex plane, the asymmetry of the distribution of only the real parts or only the imaginary parts of the sample points could be examined. As will be more apparent from the description below, a higher relative amount of phase noise will lead to a larger degree of asymmetry, which makes the asymmetry, or any other parameter representing the same, qualify as information "related to" this ratio.

Preferably, the amount of additive noise and/or phase noise is estimated based on a standard deviation of the distribution of sample points in the 2-D plane.

In a preferred embodiment, the amount of additive noise is estimated based on the distribution of distances of sample points from the origin of said 2-D plane, also referred to as "radii" herein, and in particular by determining the standard deviation ° radius of this distribution. The standard deviation of this distribution is in fact a meaningful parameter for assessing the amount of additive noise, even if the additive noise is not or not precisely Gaussian.

Similarly, the amount of phase noise is preferably estimated based on the distribution of the angular offsets of sample points assigned to a same symbol, and in particular by determining the standard deviation $\sigma_{angle}$ of this distribution, while accounting for the contribution of additive noise to the distribution of angular offsets.

In a particularly preferred embodiment, the standard deviation of the phase noise $\sigma_{phase}$ is estimated as $$\sigma_{phase} = \sqrt{\sigma_{angle}^2 - a\cos\left(1 - \frac{1}{2}\left(\frac{\sigma_{radius}}{R_{symbol}}\right)^2\right)^2}, \text{ or}$$

$$\sigma_{phase} = \sqrt{\sigma_{angle}^2 - \left(\frac{\sigma_{radius}}{R_{symbol}}\right)^2}, \text{ or}$$

$$\sigma_{phase} = \sqrt{\sigma_{angle}^2 - a\tan\left(\frac{\sigma_{radius}}{R_{symbol}}\right)^2},$$

where $R_{symbol}$ stands for the radius of the respective sample point, i. e. its distance from the origin of the 2-D plane, where "a tan" represents the inverse tangent function, and where "a cos" is the inverse cosine function.

These expressions take into consideration that part of the standard deviation of the distribution of angular offsets is due to phase noise, but that part is also due to the additive noise. Moreover, these expressions are based on the justified assumption that the phase contributions from additive noise and from phase noise can be considered to a good approximation as uncorrelated random variables whose variances sum up to the overall variance.

In a preferred embodiment, the 2-D plane is the complex plane, and each constellation point $Z_{symbol}$ of said first and second pairs of constellation points can be expressed as $$Z_{symbol} = \alpha \cdot (X_0 + i \cdot Y_0), \text{with } X_0, Y_0 \in \{-1, 1\}$$

or $$Z_{symbol}=\beta \cdot (X_0+i \cdot Y_0), \text{with } X_0, Y_0 \in \{-1,1\},$$

up to a common normalization factor and a common arbitrary phase factor. Moreover, the transmission is subjected to additive noise and phase noise, said additive noise $Z_{add}$ being defined as $$Z_{add}=n_x+i \cdot n_y,$$

wherein $n_x$ and $n_y$ are random variables distributed according to a same statistical distribution, in particular a Gaussian or nearly Gaussian distribution, and said phase noise being represented by a factor $$\exp\{i \cdot \varphi\},$$

wherein $\varphi$ is a random variable having a corresponding statistical distribution, in particular a Gaussian or nearly Gaussian distribution, such that sample point Z resulting from a constellation point $Z_{symbol}$ subjected to additive noise and phase noise is a random variable defined as $$Z=Z_{symbol} \cdot \exp\{i \cdot \varphi\}+Z_{add}.$$

In commercial systems, codirectional Raman amplification has primarily been used for optical data transmission in unrepeated systems. However, this technology can and will be used in a large variety of optical networks. Therefore, no limitations should be construed from the provided examples in view of suitable applications

DESCRIPTION OF THE PREFERRED EMBODIMENTS

For the purposes of promoting an understanding of the principles of the invention, reference will now be made to a preferred embodiment illustrated in the drawings, and specific language will be used to describe the same. It will nevertheless be understood that no limitation of the scope of the invention is thereby intended, such alterations and further modifications in the illustrated method and apparatus and such further applications of the principles of the invention as illustrated therein being contemplated as would normally occur now or in the future to one skilled in the art to which the invention relates.

Figure 1:
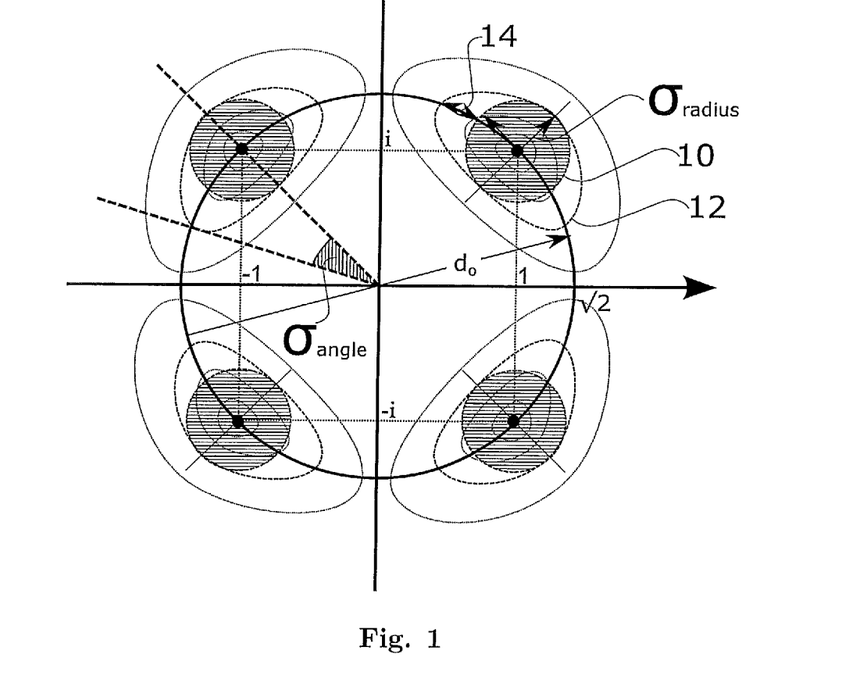
FIG. 1 shows a distribution probability of data samples resulting from constellation points being subjected to additive noise and phase noise according to a default constellation diagram.

FIG. 1 shows an ordinary normalized QPSK constellation diagram in the complex plane. The constellation diagram comprises a first pair of symbols located at (−1, −i) and (1, i); and a second pair of symbols (−1, i) and (1, −i). Accordingly, each symbol can be represented by a complex number $Z_{symbol}=X_0+i \cdot Y_0$, with $X_0, Y_0 \in \{-1, 1\}$.

Upon transmission along a transmission link, the symbols included in the data signals will be subjected to additive noise and phase noise. As already explained, the locations of the symbols emitted by a transmitter in the constellation diagram are called constellation points in the following, whereas the term sample points is used for the locations of the data samples detected by the receiver. Additive noise is characterized by random isotropic shifts of constellation points in the 2-D plane with regard to the true symbol locations. Phase noise is characterized by a random rotation of the constellation point locations with respect to the origin of the complex plane with regard to the true symbol location.

In mathematical terms, additive noise $Z_{add}$ may be defined as $Z_{add}=n_x+i \cdot n_y$, wherein $n_x$ and $n_y$ are random variables distributed according to a same statistical distribution, which in the following explanations will be assumed to be a Gaussian distribution. The phase noise may be represented by a factor $\exp\{i \cdot \varphi\}$, wherein $\varphi$ is a random variable having a corresponding statistical distribution, which in the following is likewise assumed to be a Gaussian distribution. Accordingly, the constellation points $Z_{symbol}$ subjected to additive noise and phase noise, or in other words, the sample points actually received after the transmission along the transmission link, can be statistically described by a random variable defined as $Z=Z_{symbol} \exp\{i \cdot \varphi\}+Z_{add}$.

FIG. 1 shows the statistical distribution of the random variable Z, or, in other words, of the received sample points. In absence of phase noise, the width of the distribution is represented by the circles to around each of the true symbol locations $Z_{symbol}$, where the radius of the circle to corresponds to the standard deviation of the Gaussian additive noise. The standard deviation of the additive noise is also referred to as $\sigma_{radius}$, as it corresponds to the standard deviation of the distribution of radii of the sample points in the constellation diagram, wherein the "radius" is the distance of a sample point from the origin of the complex plane (not to be confused with the radius of circle 10). The distance between two constellation points of the same pair is $d_0$ and corresponds to $2 \cdot \sqrt{2}$ in the normalized constellation diagram of FIG. 1. The radius of the circle 10 corresponding to $\sigma_{radius}$ implies that under the additive noise only, 39.35% of all sample points will lie within the circle 10. However, due to the phase noise, the distribution of the sample points is further spread out in circumferential direction as indicated from the elongate shapes 12 in FIG. 1. This aspect is illustrated by the contour lines connecting locations with constant probability density.

Figure 2:
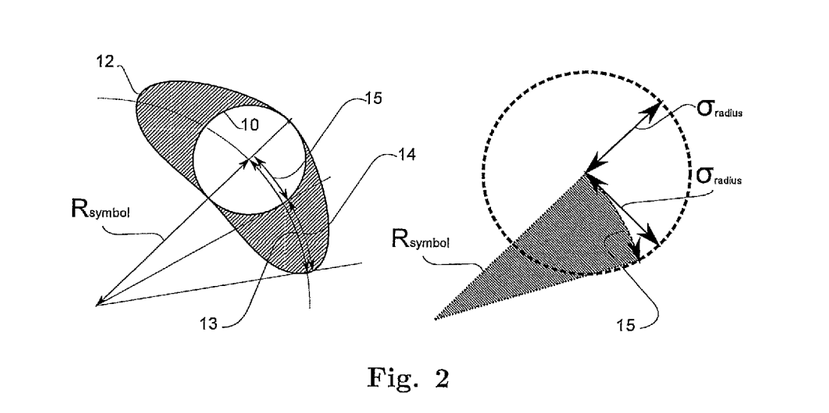
FIG. 2 is a diagram illustrating how the contribution of the additive noise to the distribution of angular offsets can be estimated.

The angle $\sigma_{angle}$ shown in FIG. 1 corresponds to the standard deviation of the distribution of angular offsets of sample points with regard to the true angular location of the symbol. Note that $\sigma_{angle}$ is not the same as the standard deviation of the phase noise, $\sigma_{phase}$, because the additive Gaussian noise likewise leads to an angular spread. As illustrated on the left of FIG. 2, the angular offset 13 can be decomposed into two contributions, namely variations of the phase due to phase noise 14 and contributions from additive noise 15. As illustrated on the right, the standard deviation $\sigma_{phase}$ of the phase noise corresponds to good approximation to the length of the arc 14 indicated in FIG. 2, divided by the radius $R_{symbol}$, which in the normalized diagram of FIG. 1 corresponds to $\sqrt{2}$, bearing in mind that all angles are expressed in radians. In view of the geometry shown in FIG. 2, and under the assumption that the phase contributions from additive noise and phase noise can be considered as uncorrelated random variables whose variances sum up to the overall variance, the following approximate expressions for the standard deviation $\sigma_{phase}$ of the phase noise may be considered:

$$\sigma_{phase} = \sqrt{\sigma_{angle}^2 - a\cos\left(1 - \frac{1}{2}\left(\frac{\sigma_{radius}}{R_{symbol}}\right)^2\right)^2} \quad (1)$$

where "a cos" represents the inverse cosine function, or $$\sigma_{phase} = \sqrt{\sigma_{angle}^2 - \left(\frac{\sigma_{radius}}{R_{symbol}}\right)^2}. \quad (2)$$

In particular in the presence of small phase variations, an improved estimate at the expense of increased mathematical complexity can be obtained with the equation $$\sigma_{phase} = \sqrt{\sigma_{angle}^2 - a\tan\left(\frac{\sigma_{radius}}{R_{symbol}}\right)^2} \quad (3)$$

where "a tan" stands for the inverse tangent function.

Figure 3:
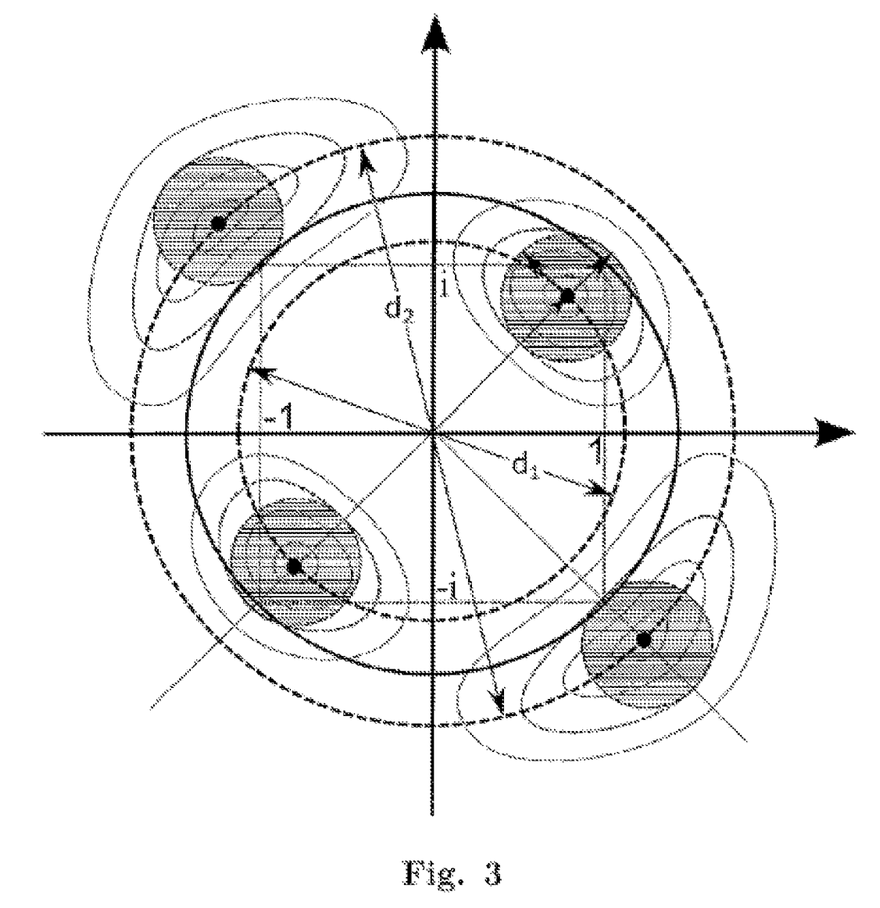
FIG. 3 shows the distribution of data samples resulting from constellation points being subjected to additive noise and phase noise according to an adjusted constellation diagram.

FIG. 3 shows a modified constellation diagram as employed in the encoding/decoding method of the invention. As is seen in FIG. 3, a first distance $d_1$ between the first pair of symbols originally located at (−1, −i) and (1, i) is decreased with regard to $d_0$ by a scaling factor $\alpha<1$, while the second distance $d_2$ between the second pair of symbols originally located at (−1, i) and (1, −i) is increased by a scaling factor $\beta>1$. Herein, the scaling factors $\alpha$ and $\beta$ are chosen such as to obey the condition $\alpha^2+\beta^2=2$, such as to keep the time-averaged power of the signal unaffected by the distance variations. The centrically symmetrical placement of symbols belonging to the same pair of symbols to the origin is not affected by this variation.

Figure 4:
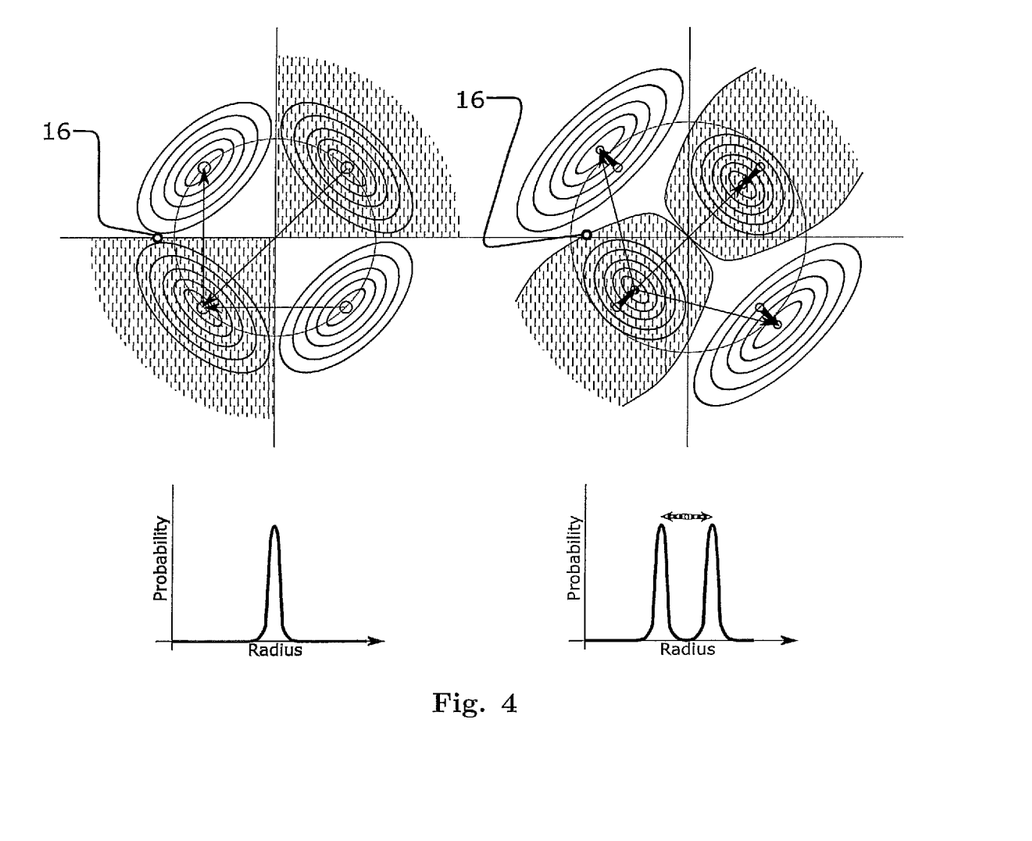
FIG. 4 shows similar constellation diagrams as FIGS. 1 and 3 as well as the corresponding decision regions and the distribution of radii.

With reference to FIG. 4, it is demonstrated how this modification of the constellation diagram leads to a decrease of the bit error rate. On the left side of FIG. 4, a spread out distribution of sample points in an ordinary QPSK constellation diagram subjected to additive noise and phase noise is shown. The alternating light and shaded regions indicate decision regions, meaning that whenever a sample point falls into this region, it is assigned to the symbol located in the region. In case of FIG. 4, the decision regions are simply the quadrants of the coordinate system. Further shown on the left part of FIG. 4 is the probability distribution of the radii of the sample points.

The right part of FIG. 4 shows a spread out distribution of sample points using the modified constellation diagram of the invention. Due to the modification of the constellation diagram, the configurations of the decision regions likewise change. The boundaries of the decision regions are lines where the probability that a sample point belongs to one of the adjusted symbols is the same. Serving as an example, a circle 16 is marking in each case a location on the border between two decision regions. As can be seen by comparison of the left and right parts of FIG. 4, due to the modification of the constellation diagram, the probability of a sample point lying on the border is significantly decreased, which allows for less errors in the assignment of sample points to the symbols, or, in other words, a reduced BER.

Figure 5:
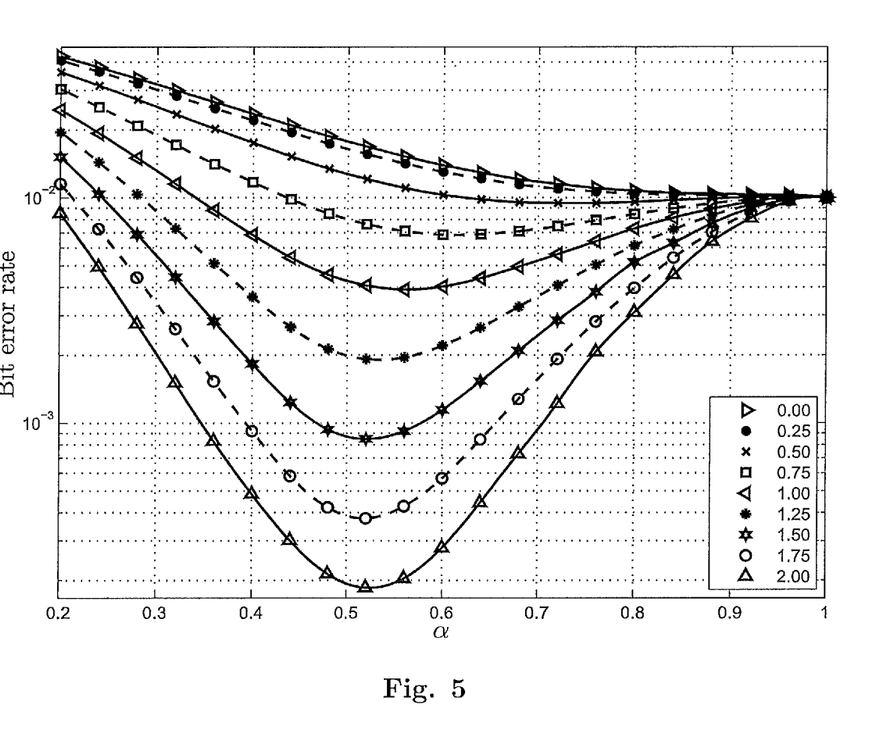
FIG. 5 shows an achievable BER as a function of scaling factor α for different values of the ratio of standard deviations.

However, it is seen that whether and to which extent such a modification of the constellation diagram leads to an improvement depends critically on the nature of the noise encountered. FIG. 5 shows the BER versus the scaling factor $\alpha$ for different ratios of standard deviations $\sigma_{phase}/\sigma_{radius}$. In each case, the total noise is chosen such that without modification, i.e. at $\alpha=1$, the BER is $10^{-2}$. As can be seen from FIG. 5, in case of no or very little phase noise, shifting of the first pair of constellation points closer together only leads to a continuous performance degradation. However, a significant improvement can be achieved with increasing amounts of phase noise.

Figure 6:
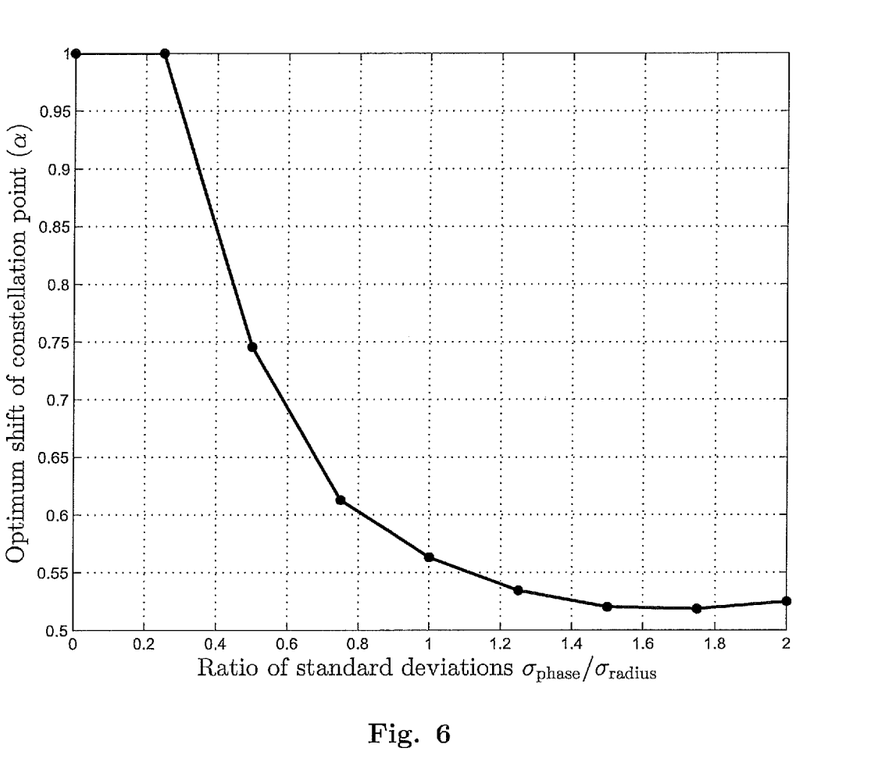
FIG. 6 shows the optimum scaling factor α as a function of the ratio of standard deviations of phase noise and additive noise.

FIG. 6 shows the relationship between the ratio of standard deviations $\sigma_{phase}/\sigma_{radius}$ and the shift of the constellation points (the scaling factor $\alpha$) that leads to optimum transmission performance. It is seen from FIG. 6 that in a wide range of parameter values, the shift providing optimal performance decreases with growing ratio $\sigma_{phase}/\sigma_{radius}$. This plot clearly demonstrates that the applied shift of the constellation points should indeed be adapted to the ratio of the two noise contributions, and further precisely defines how it should be chosen.

Figure 7:
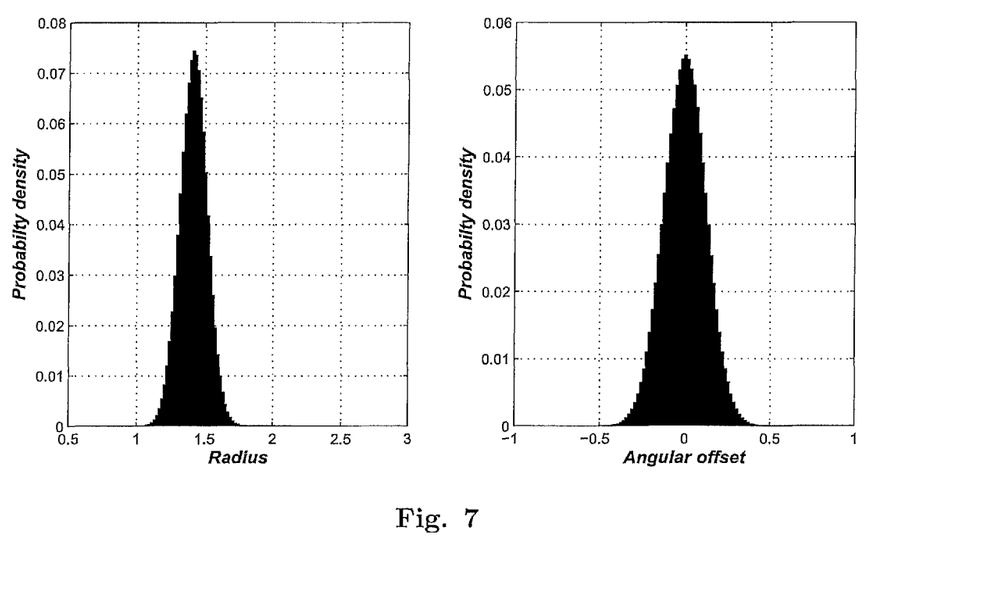
FIG. 7 shows histograms of the probability density of the radii and of the angular offsets of sample points included in a data signal transmitted via a transmission link.

As explained above, the amount of phase noise encountered upon transmission along the transmission link, and more precisely the ratio of the amount of phase noise with regard to the amount of additive noise, can be estimated based on a statistical analysis of the deviation of the sample points of received data signals from the true symbol location. FIG. 7 shows on the left a histogram of the radii of sample points, from which it can be seen that the radii obey a Gaussian-like distribution centered at $\sqrt{2}$, where the radius of a sample point is again its distance from the origin. The fact that the radii are statistically distributed rather than all precisely located at a value of $\sqrt{2}$ is due to the additive noise explained above.

On the right of FIG. 7, a histogram of the angular offset of the sample points in the received signal from the phase of the true symbol is shown, which again amounts to a Gaussian distribution. As explained above, the width of the angular distribution or phase distribution is only partly due to phase noise, but is also due to additive noise.

Figure 8:
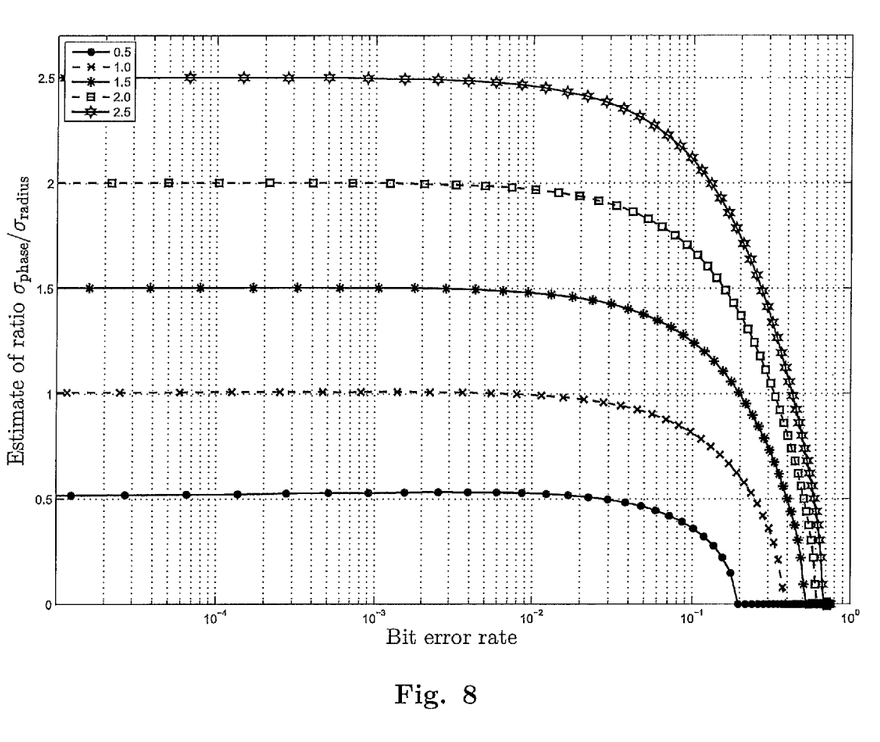
FIG. 8 shows the estimated ratio of the standard deviations of phase noise and additive noise as a function of BER.

FIG. 8 shows the estimated value of the ratio of the standard deviations $\sigma_{phase}/\sigma_{radius}$ versus bit error rate obtained by using equation (2), for different ratios of actual standard deviations that were used in simulating the noise. The actual ratio of standard deviations is constant for all data points on a curve. As is seen from FIG. 7, the estimated values are in good agreement with the actual ratio for BERs lower or equal to $10^{-2}$. Accordingly, as long as the overall noise is within reasonable limits allowing for a BER of $10^{-2}$ or below, the ratio of standard deviations $\sigma_{phase}/\sigma_{radius}$ can be estimated with good precision from the statistical analysis of the received symbols.

Figure 9:
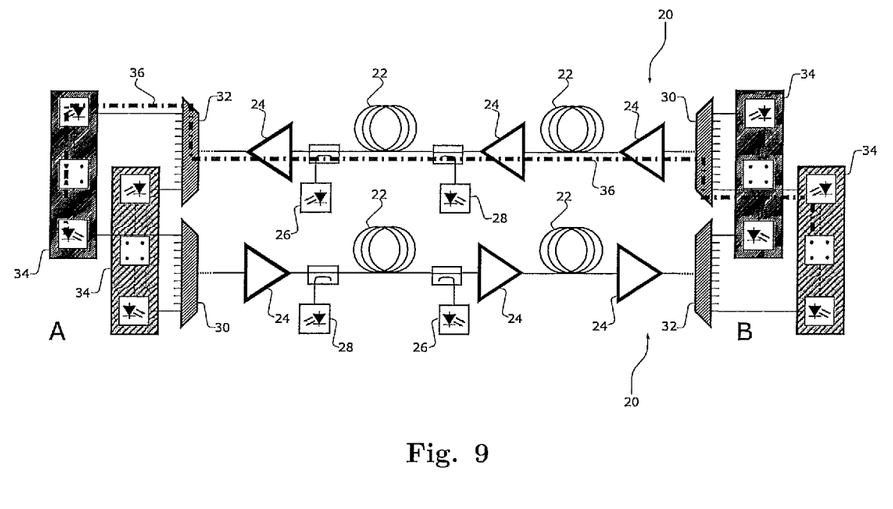
FIG. 9 shows two parallel transmission links connecting locations A and B, in which the optimum scaling factor α is transmitted from location B to location A via a supervisory channel.

FIG. 9 shows two parallel transmission links 20 connecting locations A and B. Each transmission link 20 comprises optical fibers 22 and optical amplifiers 24, such as erbium-doped fiber amplifiers (EDFA). Further included in each link 20 is a pump source 26 for counterdirectional Raman pumping, and a pump source 28 for codirectional Raman pumping. At the transmitting side of each transmission link 20, a multiplexer 30 is provided, and at the receiving side of each transmission link 20, a demultiplexer 32 is provided. At each of locations A and B, a number of transponders 34 is provided, of which only two are shown at each location in FIG. 9. Each transponder comprises a transmitter and a receiver. The number of transponders 34 corresponds to the number of wavelength division multiplex channels (WDM) transmitted over the transmission links 20, but in FIG. 9, only two of such transponders 34 are shown at each end location A, B.

Transponders are typically realized on cards that can be placed in a subrack of the communication equipment. Each card provides a data stream on one wavelength and receives another data stream on the same wavelength. However, transponders providing the functionality of several transmitters and receivers on a single card are known. Within this description, the term "transponder" is used for referring to the functionality of a transponder rather than designating a specific physical entity. In optical communications, sometimes a distinction is made between transceivers and transponders. Despite the fact that different definitions are used among experts, the addressed differences are not of relevance for the invention. Therefore, the term "transponder" as used in the following comprises transponders and transceivers.

Each transponder 34 is adapted for coherent receiving of data signals, and for generating optical data signals using the coding scheme with the adaptive constellation diagram according to the present invention. In the situation depicted in FIG. 9, the rightmost transponder 34 at location B receives a data signal over the lower transmission link 20 and carries out a statistical analysis of the deviations of sample points in the received data signal as compared to the true symbol locations, and from this analysis determines the ratio of standard deviations $\sigma_{phase}/\sigma_{radius}$ in the manner described above. Based on this ratio, an optimum scaling factor $\alpha$ can be determined from a suitable lookup table representing the relationship for the example shown in FIG. 6. This optimum scaling factor $\alpha$ is then transmitted to location A by means of a supervisory channel indicated by reference sign 36, and is further communicated to the rightmost transponder 34 at location A and used for the coding by this transponder, or by all of the transponders at location A, assuming that the ratio of phase noise and additive noise is identical for different wavelengths. The scaling factor $\alpha$ is likewise stored at the transponders 34 at location B, because it is of course also used for adapting the constellation diagram employed in decoding the data signals received at location B. In the same way, the optimum value of the scaling factor $\alpha$ may be determined from data signals received at the transponders 34 at location A via the upper transmission link 20 of FIG. 9, and this scaling factor $\alpha$ is communicated to the transponders at location B via a further supervisory channel (not shown). Of course, scaling parameter values might also be transmitted via the overhead sections of the data streams. However, this might require scanning the allowed parameters range for a suitable setting when installing a system for the first time.

Alternatively, statistical data or the ratio of standard deviations can be communicated instead of the optimum scaling factor to the transmitter at location A for determining the optimum scaling factors. However, this solution requires to transmit the determined optimum scaling factor to the receiver at location B by a complementary supervisory channel transmitting data in opposite direction, e.g. from location A to location B.

Figure 10:
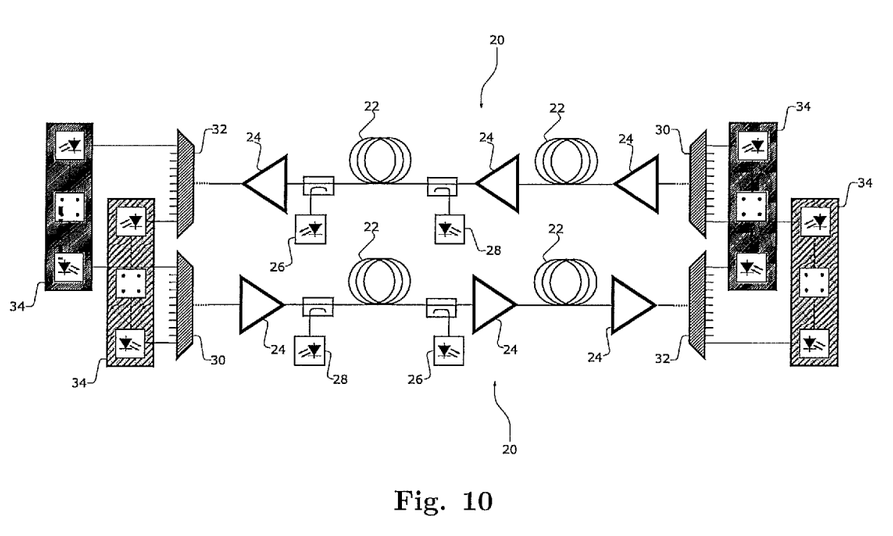
FIG. 10 shows the same two parallel transmission links as FIG. 9, but without communication of the value a via the supervisory channel.

In the embodiment shown in FIG. 9, at each location A and B a scaling factor $\alpha$ is hence determined based on the statistical analysis of the data signals received, and this factor $\alpha$ is forwarded to the respective other location to be used in encoding data to be transmitted. However, since the two transmission links 20 are very similar, in practice it will often turn out that the ratio of phase noise versus additive noise will be very similar as well, such that the two respective values of $\alpha$ will be the same or almost the same. Accordingly, instead of forwarding the determined value of $\alpha$ to the other side for the purposes of encoding with an adapted constellation diagram, it is also possible that each side uses the locally determined value of $\alpha$ for its own encoding purposes. This is schematically shown in FIG. 10, which shows the same two transmission links 20 as FIG. 9, but which dispenses with the communication of the value of $\alpha$ via the supervisory channel. Instead, the value of $\alpha$ determined in the analysis in the leftmost transponder 34 at location A is also used for adaption of the constellation diagram for the purposes of encoding signals to be transmitted from location A to location B.

Figure 11:
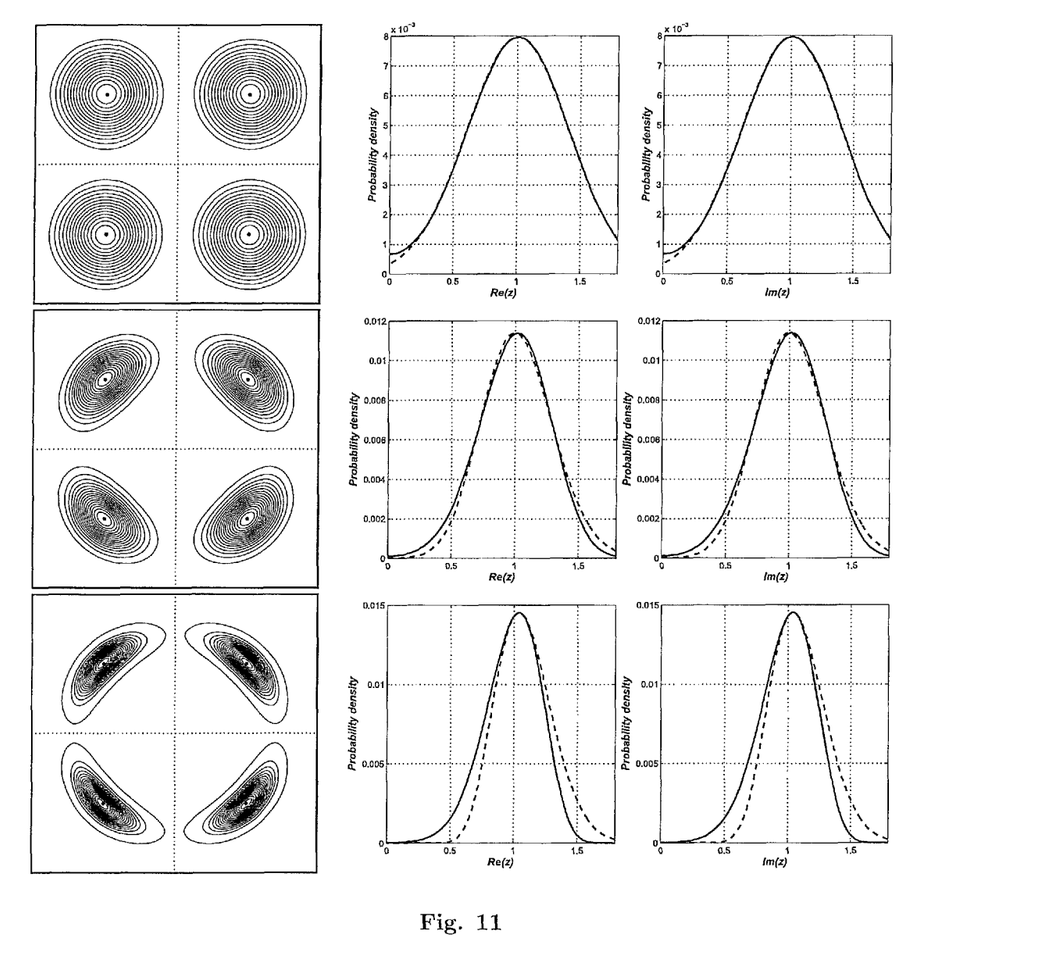
FIG. 11 shows in the left column probability distributions of sample points for varying degrees of phase noise, in the middle column the real parts of the sample points and in the right: the imaginary part of the sample points. In the diagrams of the second and third columns, a dashed curve is added which represents a mirrored version of the solid curve, with a vertical mirror axis located at the maximum of the respective distribution.

Instead of directly determining the ratio of the amount of phase noise with regard to the amount of additive noise, it is likewise possible to base the adjustment of the constellation diagram on further information related to this ratio. An example of this is shown with reference to FIG. 11. In the left column of FIG. 11, the probability distribution of sample points is shown, where the ratio of phase noise to additive noise increases from top to bottom. The middle column shows with the solid line the distribution of the real parts (Re(Z)) of the sample points, and the right column shows the distribution of the imaginary parts (Im(Z)) of the sample points. In the diagrams of the second and third columns, a dashed curve has been added which represents a mirrored version of the solid curve, with a vertical mirror axis located at the maximum of the respective distribution. Deviations of the dashed and solid curves hence show an asymmetry in the distribution. As is seen from FIG. 11, this asymmetry clearly increases with an increasing ratio of phase noise. Accordingly, the asymmetry, or any parameter reflecting the asymmetry can be regarded as "information related to the ratio of the amount of phase noise with regard to the amount of additive noise", and the adjustment of the constellation diagram may be based on this information as well.

Figure 12:
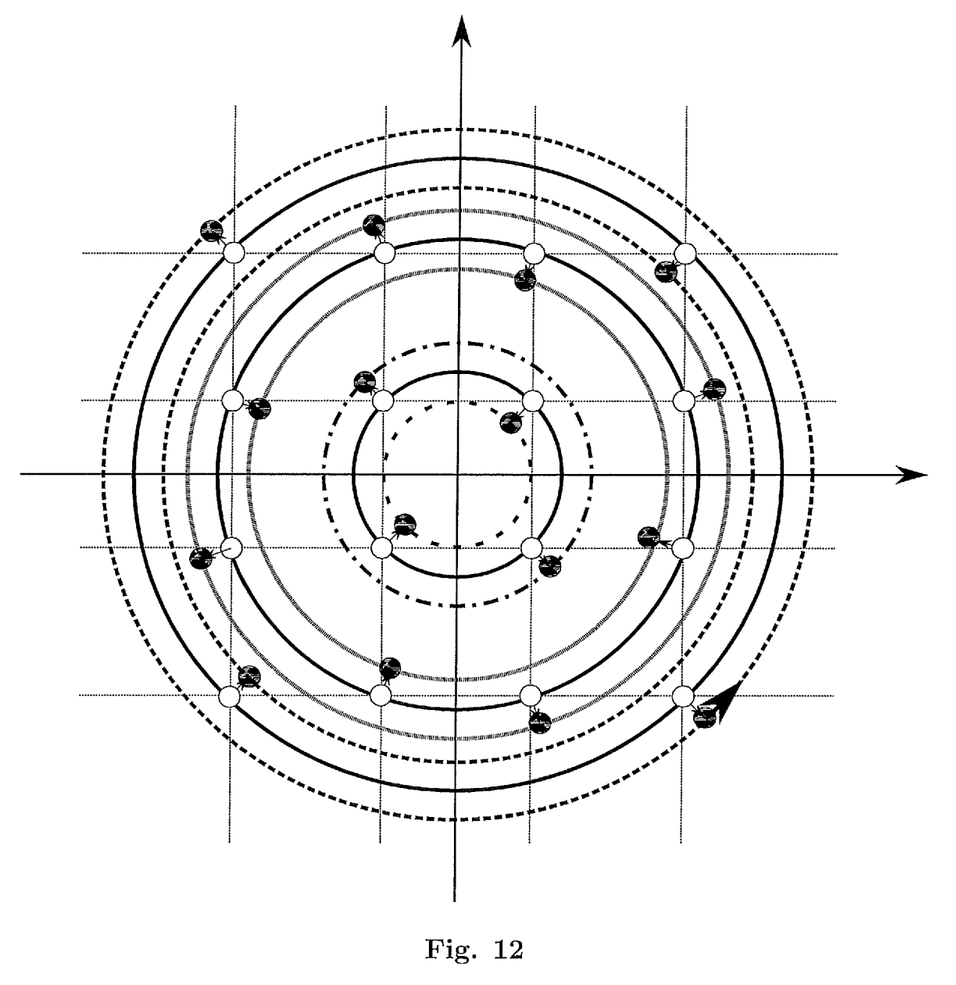
FIG. 12 shows an adjustable constellation diagram including 16 symbols.

While in the previous description reference has only been made to constellation diagrams including two pairs of symbols, this shall not rule out that the constellation diagram includes more than these two pairs of symbols. FIG. 12 shows an example of an adjustable constellation diagram including eight pairs of symbols, which in the default condition, i.e. without variation of the distances or radii, are located on three different radii. In this constellation diagram, the two innermost pairs of symbols resemble the two pairs of symbols referred to in the summary of the invention. In FIG. 12, the default positions of the symbols are represented by the light symbols, while the shifted positions are indicated by the shaded symbols. As is seen in FIG. 12, the outer six pairs of symbols can be shifted in a similar manner as the innermost two pairs of symbols, with similar effects on an improved bit error rate.

Although a preferred exemplary embodiment is shown and specified in detail in the drawings and the preceding specification, these should be viewed as purely exemplary and not as limiting the invention. It is noted in this regard that only the preferred exemplary embodiment is shown and specified, and all variations and modifications should be protected that presently or in the future lie within the scope of protection of the invention as defined in the claims.

REFERENCE SIGNS 10 circle indicating standard deviation of sample distribution due to Gaussian additive noise
12 elongate shape indicating sample distribution due to Gaussian additive noise and Gaussian phase noise
13 angular offset
14 arc representing standard deviation of Gaussian phase noise
15 arc representing contribution to angular sample distribution due to additive Gaussian noise
16 circle marking location on the border between two decision regions
20 transmission link
22 optical fiber
24 optical amplifier
26 pump source for counterdirectional Raman pumping
28 pump source for codirectional Raman pumping
30 multiplexer
32 demultiplexer
34 transponder
36 supervisory channel

The invention claimed is:

1. A method of processing data for optical data transmission along a transmission link, the method comprising the steps of:
encoding the data based on an adaptive constellation diagram in a 2-D plane, the adaptive constellation diagram including at least a first pair of symbols and a second pair of symbols,
wherein respective symbols of the first pair of symbols are located at opposite sides of an origin of the 2-D plane at a first distance $d_1$ from each other,
wherein respective symbols of the second pair of symbols are located at opposite sides of the origin of the 2-D plane at a second distance $d_2$ from each other,
wherein a line in the adaptive constellation diagram connecting the first pair of symbols is perpendicular to a line in the adaptive constellation diagram connecting the second pair of symbols,
adapting the adaptive constellation diagram for data transmission by varying a first ratio of the first distance $d_1$ and the second distance $d_2$ to minimize or nearly minimize a bit error rate in the transmitted data,
wherein the first distance $d_1$ does not equal the second distance $d_2$ in the first ratio once the adaptive constellation diagram for data transmission has been adapted according to the adapting step to minimize or nearly minimize the bit error rate in the transmitted data,
wherein the first ratio is varied in the adapting step to a degree that is determined based on information corresponding to:
a second ratio of the amount of a phase noise and an amount of an additive noise to which an optical data transmission along the transmission link is subject, the phase noise characterized by a random rotation of at least one constellation point location with respect to the origin of the 2-D plane, and the additive noise characterized by at least one random isotropic shift of at least one constellation point in the 2-D plane.

2. The method of claim 1, wherein the step of adapting the adaptive constellation diagram for data transmission by varying the first ratio comprises scaling a base distance $d_0$ with corresponding scaling factors $\alpha$, $\beta$ according to $d_1 = d_0 \cdot \alpha$, and $d_2 = d_0 \cdot \beta$, so as to keep constant a time-averaged power of the optical data transmission, in particular by providing for $\alpha^2 + \beta^2 = 2$.

3. The method of claim 1, wherein the optical data transmission comprises transmission, in a same direction, of both data signals and a pump wavelength.

4. The method of claim 1, wherein at least one of the amount of the phase noise,
the amount of the additive noise,
the information corresponding to the second ratio,
is estimated based on a statistical analysis of at least one of
sample points of data signals received at a receiving side of the transmission link,
sample points of data signals of a reverse data transmission received at a transmitting side of the transmission link.

5. The method of claim 4, wherein the information corresponding to the second ratio corresponds to an asymmetry in a statistical distribution of sample points in a direction parallel to a line in the adaptive constellation diagram interconnecting two adjacent non-adjusted symbols in the 2-D plane.

6. The method of claim 4, wherein at least one of
the amount of the additive noise,
the amount of the phase noise,
is estimated based on a standard deviation of a distribution of sample points in the 2-D plane.

7. The method of claim 4, wherein the amount of the additive noise is estimated based on a distribution of respective distances of sample points from the origin of the 2-D plane.

8. The method of claim 7, wherein the amount of the phase noise is estimated based on a distribution of angular offsets of constellation points assigned to a same symbol, while accounting for a contribution of additive noise to the distribution of angular offsets, and wherein a standard deviation of the phase noise $\sigma_{phase}$ is estimated as $$\sigma_{phase} = \sqrt{\sigma_{angle}^2 - a\cos\left(1 - \frac{1}{2}\left(\frac{\sigma_{radius}}{R_{symbol}}\right)^2\right)^2}, \text{ or}$$

$$\sigma_{phase} = \sqrt{\sigma_{angle}^2 - \left(\frac{\sigma_{radius}}{R_{symbol}}\right)^2}, \text{ or}$$

$$\sigma_{phase} = \sqrt{\sigma_{angle}^2 - a\tan\left(\frac{\sigma_{radius}}{R_{symbol}}\right)^2},$$

wherein $R_{symbol}$ denotes the respective distance of a given one of the sample points from the origin of the 2-D plane, and a tan represents an inverse tangent function and a cos represents an inverse cosine function.

9. The method of claim 4, wherein the amount of the phase noise is estimated based on a distribution of angular offsets of constellation points assigned to a same symbol, while accounting for a contribution of additive noise to the distribution of angular offsets.

10. The method of claim 1, wherein the 2-D plane is a complex plane, and each constellation point $Z_{symbol}$ of each of the first pair of symbols and the second pair of symbols can be expressed as one of $Z_{symbol}=\alpha \cdot (X_0+i \cdot Y_0)$, with $X_0, Y_0 \in \{-1,1\}$, $Z_{symbol}=\beta (X_0+i \cdot Y_0)$, with $X_0, Y_0 \in \{-1,1\}$, up to a common normalization factor and a common arbitrary phase factor, wherein the additive noise is defined as $Z_{add}$ as follows:

$Z_{add}=n_x+i \cdot n_y$, wherein $n_x$ and $n_y$ are random variables distributed according to a same statistical distribution, wherein the phase noise is represented by a factor $\exp\{i \cdot \varphi\}$, wherein $\varphi$ is a random variable having a corresponding statistical distribution, wherein a given sample point Z originating from a given constellation point $Z_{symbol}$ subjected to the additive noise and the phase noise is a random variable defined as $Z=Z_{symbol} \exp\{i \cdot \varphi\}+Z_{add}$.

11. A transmitter for transmitting an optical data signal along a transmission link, comprising an encoding unit configured for encoding data to be transmitted by the optical data signal, the encoding being based on an adaptive constellation diagram in a 2-D plane, the adaptive constellation diagram including at least a first pair of symbols and a second pair of symbols, wherein respective symbols of the first pair of symbols are located at opposite sides of an origin of the 2-D plane at a first distance $d_1$ from each other, wherein respective symbols of the second pair of symbols are located at opposite sides of the origin of the 2-D plane at a second distance $d_2$ from each other, wherein a line in the adaptive constellation diagram connecting the first pair of symbols is perpendicular to a line in the adaptive constellation diagram connecting the second pair of symbols, wherein the encoding unit is further configured for adapting the adaptive constellation diagram for data transmission by varying a first ratio of the first distance $d_1$ and the second distance $d_2$ to minimize or nearly minimize a bit error rate in the transmitted data, wherein the first distance $d_1$ does not equal the second distance $d_2$ in the first ratio of the adaptive constellation diagram for data transmission once adapted by the encoding unit to minimize or nearly minimize the bit error rate in the transmitted data, wherein the varying of the first ratio is to a degree that is determined based on information corresponding to a second ratio of the amount of a phase noise and an amount of an additive noise to which an optical data transmission along the transmission link is subject, the phase noise characterized by a random rotation of at least one constellation point location with respect to the origin of the 2-D plane, and the additive noise characterized by at least one random isotropic shift of at least one constellation point in the 2-D plane.

12. The transmitter of claim 11, wherein the varying of the first ratio comprises scaling a base distance $d_0$ with corresponding scaling factors $\alpha$, $\beta$ according to $d_1=d_0 \cdot \alpha$, and $d_2=d_0 \cdot \beta$, so as to keep constant a time-averaged power of the optical data transmission, in particular by providing for $\alpha^2+\beta^2=2$.

13. A system comprising:

a transmitter configured to transmit an optical data signal along a transmission link, and a receiver configured to receive the optical data signal transmitted along the transmission link, wherein the transmitter comprises an encoding unit configured for encoding data to be transmitted by the optical data signal, the encoding being based on an adaptive constellation diagram in a 2-D plane, the adaptive constellation diagram including at least a first pair of symbols and a second pair of symbols, wherein respective symbols of the first pair of symbols are located at opposite sides of an origin of the 2-D plane at a first distance $d_1$ from each other, wherein respective symbols of the second pair of symbols are located at opposite sides of the origin of the 2-D plane at a second distance $d_2$ from each other, wherein a line in the adaptive constellation diagram connecting the first pair of symbols is perpendicular to a line in the adaptive constellation diagram connecting the second pair of symbols, wherein the encoding unit is further configured for adapting the adaptive constellation diagram for data transmission by varying a first ratio of the first distance $d_1$ and the second distance $d_2$ to minimize or nearly minimize a bit error rate in the transmitted data, wherein the first distance $d_1$ does not equal the second distance $d_2$ in the first ratio of the adaptive constellation diagram for data transmission once adapted by the encoding unit to minimize or nearly minimize the bit error rate in the transmitted data, wherein the varying of the first ratio is to a degree that is determined based on information corresponding to a second ratio of the amount of a phase noise and an amount of an additive noise to which an optical data transmission along the transmission link is subject, the phase noise characterized by a random rotation of at least one constellation point location with respect to the origin of the 2-D plane, and the additive noise characterized by at least one random isotropic shift of at least one constellation point in the 2-D plane, wherein the receiver comprises a decoding unit configured for decoding the received optical data signal based on the adaptive constellation diagram.

* * * * *